(12) United States Patent
Reial et al.

(10) Patent No.: US 12,324,025 B2
(45) Date of Patent: Jun. 3, 2025

(54) METHOD AND APPARATUS FOR PHYSICAL UPLINK SHARED CHANNEL FORMAT ADAPTATION

(71) Applicant: Telefonaktiebolaget LM Ericsson (publ), Stockholm (SE)

(72) Inventors: Andres Reial, Lomma (SE); Zhipeng Lin, Nanjing Jiangsu (CN); Jan Christoffersson, Luleå (SE); Johan Axnäs, Solna (SE); Henrik Enbuske, Stockholm (SE); Robert Mark Harrison, Grapevine, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 799 days.

(21) Appl. No.: 17/439,864

(22) PCT Filed: Mar. 27, 2020

(86) PCT No.: PCT/EP2020/058821
§ 371 (c)(1),
(2) Date: Sep. 16, 2021

(87) PCT Pub. No.: WO2020/201142
PCT Pub. Date: Oct. 8, 2020

(65) Prior Publication Data
US 2022/0191944 A1    Jun. 16, 2022

(30) Foreign Application Priority Data
Mar. 29, 2019    (WO) ............... PCT/CN2019/080566

(51) Int. Cl.
*H04W 74/0833*    (2024.01)
*H04W 72/044*    (2023.01)
(Continued)

(52) U.S. Cl.
CPC .... *H04W 74/0841* (2013.01); *H04W 72/0466* (2013.01); *H04W 74/002* (2013.01); *H04W 74/0866* (2013.01)

(58) Field of Classification Search
None
See application file for complete search history.

(56) References Cited

U.S. PATENT DOCUMENTS

| 2017/0019930 A1 | 1/2017 | Lee et al. |
| 2018/0027594 A1 | 1/2018 | Nagaraja et al. |

(Continued)

FOREIGN PATENT DOCUMENTS

| CN | 109479332 A | 3/2019 |
| WO | 2018133437 A1 | 7/2018 |

OTHER PUBLICATIONS

R1-1903435 Summary of 7.2.1.1 Channel Structure for Two-step RACH Mar. 2019.*

(Continued)

*Primary Examiner* — Christopher T Wyllie
(74) *Attorney, Agent, or Firm* — Murphy, Bilak & Homiller, PLLC

(57) ABSTRACT

The present disclosure provides a method in a User Equipment of transmitting a random access preamble and a physical uplink shared channel, comprising: determining a resource size to be used to contain the physical uplink shared channel, the resource size being one of a set of predetermined sizes; identifying a resource to be used from a predetermined set of resources, the resource in the set of resources corresponding to the determined resource size, each resource being identified with a respective first index n and occupying a distinct set of OFDM symbols and subcarriers; identifying a PRACH preamble with a second index n' corresponding to the first index n of the identified resource;

(Continued)

and transmitting the identified PRACH preamble, and the physical uplink shared channel in the identified resource.

18 Claims, 7 Drawing Sheets

(51) Int. Cl.
*H04W 74/00* (2009.01)
*H04W 74/08* (2009.01)

(56) References Cited

U.S. PATENT DOCUMENTS

| | | | |
|---|---|---|---|
| 2018/0198646 | A1 | 7/2018 | Gau et al. |
| 2021/0307082 | A1* | 9/2021 | Wang ............... H04W 72/1263 |
| 2022/0070941 | A1* | 3/2022 | Farag ............... H04W 74/0836 |
| 2022/0191944 | A1* | 6/2022 | Reial ............... H04W 74/0866 |
| 2023/0043319 | A1* | 2/2023 | Ji ............... H04J 13/0062 |
| 2024/0048425 | A1* | 2/2024 | Aldridge ............ H04L 27/2602 |

OTHER PUBLICATIONS

Summary of 7.2.1.1 Channel Structure for Two-step RACH R1-1903435 Mar. 3, 2019 (Year: 2019).*

"3GPP TS 38.331 V15.4.0", 3rd Generation Partnership Project; Technical Specification Group Radio Access Network; NR; Radio Resource Control (RRC) protocol specification (Release 15), Dec. 2018, pp. 1-474.

"Channel Structure for Two-Step RACH", 3GPP TSG-RAN WG1 Meeting #96bis, R1-1904842, Xi'an, China, Apr. 8-12, 2019, pp. 1-5.

"Channel structure for two-step RACH", 3GPP TSG RAN WG1 #96, R1-1902466, Athens, Greece, Feb. 25-Mar. 1, 2019, pp. 1-8.

"Discussion on Channel Structure for 2-Step RACH", 3GPP TSG RAN WG1 Meeting #96, R1-1902027, Athens, Greece, Feb. 25-Mar. 1, 2019, pp. 1-5.

"Introduction of two-step RACH in NR", 3GPP TSG-RAN WG1 Meeting #99, R1-1913627, Reno, USA, Nov. 18-22, 2019, pp. 1-21.

"On 2-step RACH Channel Structure", 3GPP TSG RAN WG1 #96, R1-1902135, Athens, Greece, Feb. 25-Mar. 1, 2019, pp. 1-8.

"Summary of 7.2.1.1 Channel Structure for Two-step RACH", 3GPP TSG RAN WGl #96, Rl-1903435, Athens, Greece, Feb. 25-Mar. 1, 2019, pp. 1-28.

"Use Cases and Scenarios for 2-Step RACH", 3GPP TSG-RAN WG1 Meeting #96bis, R1-1904841, Xi'an, China, Apr. 3-12, 2019, pp. 1-3.

"3GPP TS 38.213 V15.4.0", 3rd Generation Partnership Project; Technical Specification Group Radio Access Network; NR; Physical layer procedures for control (Release 15), Dec. 2018, pp. 1-104.

"3GPP TS 38.321 V15.4.0", 3rd Generation Partnership Project; Technical Specification Group Radio Access Network; NR; Medium Access Control (MAC) protocol specification (Release 15), Dec. 2018, pp. 1-77.

"3GPP TS 38.211 V15.4.0", 3rd Generation Partnership Project; Technical Specification Group Radio Access Network; NR; Physical channels and modulation (Release 15), Dec. 2018, pp. 1-96.

ZTE Corporation, et al., "New work item: 2-step RACH for NR", 3GPP TSG RAN Meeting #82, RP-182894, Sorrento, Italy, Dec. 10-13, 2018, pp. 1-5.

* cited by examiner

METHOD AND APPARATUS FOR PHYSICAL UPLINK SHARED CHANNEL FORMAT ADAPTATION

TECHNICAL FIELD

The present disclosure generally relates to wireless communication technique fields, in particular to methods and apparatuses for Physical Uplink Shared Channel (PUSCH) format adaptation.

BACKGROUND

Next generation systems are expected to support a wide range of use cases with varying requirements ranging from fully mobile devices to stationary Internet of Things (IoT) or fixed wireless broadband devices. In New Radio (NR), both licensed assisted access and standalone unlicensed operation are to be supported in the $3^{rd}$ Generation Partner Project (3GPP). Random Access Channel (RACH) procedures in NR will be introduced below to facilitate understanding.

The ordinary four step random access (four-step RA) procedure has been the current standard for legacy systems such as Long Term Evolution (LTE) and 3GPP NR Rel-15. It has been proposed to study a two-step procedure where the Uplink (UL) messages including Physical Random Access Channel (PRACH) and Physical Uplink Shared Channel (PUSCH) are sent simultaneously (or at least without any intermediate response from e.g. the eNB) and similarly the two Downlink (DL) messages (e.g. time advance command in Random Access Response (RAR) and contention resolution information) are sent as a simultaneous response in the DL. In the legacy four step procedure, one of the main usages of the first two messages is to obtain UL time alignment for the User Equipment (UE). In many situations, e.g. in small cells or for stationary UEs, this may not be needed since either a zero timing alignment or timing advance (TA) value (i.e., TA=0) will be sufficient (small cells) or a stored TA value from the last RA could serve also for the current RA (stationary UE). In future radio networks it can be expected that these situations will be common, both due to dense deployments of small cells and a great number of e.g. stationary IoT devices. An RA process in which no message exchange is required to obtain the TA value would lead to reduced RA latency and would be beneficial in several use cases, for example when transmitting infrequent small data packets. Another benefit with the two-step procedure for NR in unlicensed spectrum (NR-U) is that it may not need four listen before talk (LBT) trials to be completed as is the case for the four-step procedure.

As noted above, legacy four-step Random Access is the baseline for random access in both LTE and NR. The principle of this procedure is shown in FIG. 1a. The UE first randomly selects a preamble which is transmitted.

When the eNodeB (eNB) detects the preamble, it estimates the TA the UE should use in order to obtain UL synch at the eNB. The eNB responds with the TA and a grant of resources for the transmission of Message 3 (Msg3). In Msg3 the UE transmits its identifier, and the eNB responds by acknowledging the UE ID in Msg 4. The Msg 4 gives contention resolution, i.e. only one UE's identifier will be sent even if several UEs have used the same preamble (and Msg 3) simultaneously. In LTE, the four-step RA cannot be completed in less than 14 ms/TTI/SF (transmission time intervals, or subframes).

The two-step RA gives much shorter latency than the ordinary four-step RA. In the two-step RA the preamble (transmitted on PRACH) and a message corresponding to Message 3 in the four-step RA (transmitted on PUSCH) are transmitted in the same or in two subsequent sub frames.

The first message in the two-step procedure is denoted Message A (MsgA) in NR-U. The two-step procedure is depicted in FIG. 1b. In the four-step procedure, the gNodeB (gNB) grant is linked to a particular preamble. The same kind of mapping may be needed in the two-step procedure. For all different preamble identities (IDs) that have been configured for the two-step there should be a mapping to a particular PUSCH resource. The PUSCH resource may be time multiplexed, frequency multiplexed or code multiplexed. In 3GPP Rel.16 NR the PRACH and PUSCH resource will be time multiplexed (i.e., time-division multiplexing, TDM).

Upon successful reception of MsgA (i.e. both the preamble and PUSCH), the eNB will respond with a TA (which by assumption should not be needed or just give very minor updates) and a Msg 4 for contention resolution. The second message in the two-step procedure is denoted Message B (MsgB) in NR-U.

The preamble format used for the two-step RA procedure is configured in System Information (SI) together with the time and frequency resources (PRACH occasions) which are given by the prach-ConfigurationIndex. An example of how the preamble formats can be allocated in a slot is shown in FIG. 1c, which illustrates the time occupied by different PRACH occasions according to the PRACH format, where $1^{st}$ indicates a first PRACH occasion, $2^{nd}$ indicates the second PRACH occasion, and so on. A 1 ms subframe is shown, comprised of 14 orthogonal frequency-division multiplexed (OFDM) symbols. The symbols a PUSCH occupies in the subframe (if it has a 15 kHz subcarrier spacing) are also shown for reference. The labels starting with A, B, or C are the different PRACH formats. Note that this is not an exhaustive list of all configurations of 3GPP Rel-15 PRACH; it is only shown as an example.

The PUSCH component of MsgA is transmitted shortly after the preamble component, preferably with a gap not exceeding 16 μs in order to obviate the need for separate Listen before talk (LBT) procedures in NR-U.

Multi-User Multiple-Input Multiple-Output (MU-MIMO) and Non-Orthogonal Multiple Access (NOMA) are introduced for 3GPP Rel-15 NR PUSCH as follows.

Multiple access capacity in the uplink of 3GPP Rel-15 NR can be increased through the use of MU-MIMO and/or NOMA techniques. NR supports these techniques by allowing different UEs to transmit PUSCH Demodulation Reference Signal (DMRS) differently. UEs may transmit one or more of up to 12 DMRS antenna ports p̃, as described in 3GPP Technical Specification (TS) 38.211 section 6.4.1.1.3. DMRS antenna ports transmitted from different UEs tend to have low mutual interference because different ports are mapped to different resource elements and/or are transmitted in the same resource elements but with different orthogonal cover sequences for the different antenna ports. This means that when UEs simultaneously transmit in the same uplink Physical Resource Blocks (PRBs) in a slot but with different DMRS antenna ports, the gNB may generally form good channel estimates to each UE due to the low mutual interference property. Given good channel estimates, interference rejection receivers, including linear interference rejection receivers such as Minimum Mean Square Error Interference Rejection Combining (MMSE-IRC) receivers may successfully receive the simultaneously transmitted multiple PUSCHs in the same uplink PRBs in a slot.

The PUSCH DMRS sequence is a pseudo-random sequence for Orthogonal Frequency Division Multiplexing (OFDM) transmission (when transform precoding is disabled), and is initialized using the parameter $N_{ID}^{nSCID}$, and/or $n_{SCID}$ which may be different for different UEs. Such transmissions may be said to have different DMRS scrambling, and $N_{ID}^{nSCID}$ and $n_{SCID}$ may be referred to as scrambling identities or scrambling IDs. For discrete Fourier transform spread OFDM (DFT-S-OFDM), when transform precoding is enabled, a Zadoff-Chu sequence is used for PUSCH DMRS, and the DMRS sequence group may be different for different UEs according to if the parameter $n_{ID}^{RS}$ is set by higher layers for the UE. Using different DMRS sequence groups may be loosely referred to as using different DMRS scrambling, since both pseudo-random sequences with different initialization and different Zadoff-Chu sequence groups have low, but more than zero, cross-correlation, and therefore $n_{ID}^{RS}$ may be referred to as a scrambling identity or a scrambling ID. In this way, the DMRS sequences transmitted in a given slot are different for different UEs with different values of $N_{ID}^{nSCID}$, and/or $n_{SCID}$ in the case of OFDM transmission, and with different $n_{ID}^{RS}$ in the case of DFT-S-OFDM. In sufficiently good channel conditions, a receiver can separate the differently scrambled DMRS, and form good channel estimates for each UE. Therefore, gNBs may use interference rejection receivers to receive the simultaneously transmitted PUSCHs, as in the case where different DMRS antenna ports are used. Therefore, MU-MIMO can be supported with either or both of different DMRS ports and different DMRS scrambling.

Forward Error Correction (FEC) encoded bits in codewords in PUSCH are scrambled prior to modulation, as described in 3GPP TS 38.211 revision 15.4.0, subclause 6.3.1.1. The scrambling initialization depends on a radio network temporary identity (RNTI) $n_{RNTI}$ associated with the PUSCH transmission and a parameter $n_{ID}$ that may be configured to each UE, according to $c_{init} = n_{RNTI} \cdot 2^{15} + n_{ID}$. When $n_{ID}$ is different for different UEs, their FEC encoded bits are scrambled in different ways, and therefore $n_{ID}$ may be referred to as a scrambling identity or scrambling ID. At sufficiently high signal-to-noise ratio (SNR) and low enough FEC code rate, a non-linear gNB receiver suppresses the mutual interference between simultaneously transmitted PUSCHs in the same PRBs and slot, and therefore NOMA can be supported using different PUSCH scrambling. It should be noted that accurate channel estimation is needed for NOMA, and so NOMA UEs should transmit on different DMRS antenna ports and/or using different DMRS scrambling. Therefore, NOMA transmission can be seen as a subset of MU-MIMO transmission in 3GPP Rel-15 NR, where different PUSCH scrambling is used along with different DMRS antenna ports or DMRS scrambling.

In two-step RA, the payload in MsgA PUSCH is transmitted without receiving an UL grant as part of the RA procedure (in contrast to the grant-based Msg3 in the traditional four-step RACH). The default solution is therefore to define in the NR specifications a single PUSCH format and Modulation and Coding Scheme (MCS) that ensure coverage for any UEs within a cell area with a predetermined minimum UL link quality.

However, such fixed PUSCH allocation is typically conservative for most UEs in the cell that are not in the power-limited regime (e.g. near a cell edge in a macro cell) and does not allow them to fully utilize the payload that would be possible for given UL resources.

SUMMARY

In view of the above, it is an object to provide an improved two-step RACH MsgA PUSCH format and/or MCS selection to eliminate or mitigate the deficiencies as mentioned above.

According to an aspect of the disclosure, there is provided a method for Physical Uplink Shared Channel, PUSCH, format adaptation by a network node, comprising, determining a first format to be used for two-step Random Access Channel, RACH, Message A, MsgA, by a first group of User Equipment in a cell based on deployment information; and signaling the first format to the first group of UEs in System Information, SI.

In an embodiment, the method may further comprise determining at least one criterion and at least a second format to be used for two-step RACH MsgA by at least a second group of UEs not satisfying the criterion in the cell; and signaling the second format and the criterion to the second group of UEs in System Information SI.

The criterion may include a PUSCH block error rate (BLER) during a single transmission in performance criterion for uplink coverage.

The first format and the second format may include one or more of a number of resources, location in time/frequency, modulation and coding scheme, code rate, and code/transport block size, a mapping type.

The deployment information may include one or more of a path loss and UE uplink transmit power, UE uplink transmission scheme and a number of antennas.

In an embodiment, signaling the first format or the second format may comprise providing an index to a predetermined list of modulation and coding scheme, MCS, values; or providing an explicit individual parameter value.

According to another aspect of the disclosure, there is further provided a method for Physical Uplink Shared Channel, PUSCH, format adaptation by a network node, comprising, determining a format to be used for two-step Random Access Channel, RACH, Message A, MsgA, by a User Equipment, UE, in a cell based on previous link quality information; and signaling the format to the UE via dedicated signaling.

In an embodiment, determining a format may be based on a triggering condition or presence of payload of a logical channel or a set of logical channels to meet a target performance.

According to another aspect of the disclosure, there is further provided a method for Physical Uplink Shared Channel, PUSCH, format adaptation by a User Equipment in a random access procedure, comprising, obtaining a format from a network node via broadcast System Information or dedicated signaling; making one or more random access transmission attempts, wherein each transmission attempt comprises transmitting at least the PUSCH using the obtained format; and a first transmission attempt comprises transmitting a Physical Random Access Channel, PRACH, preamble, and transmitting a PUSCH using the obtained format; and making successive transmission attempts if a response from the network node to a prior transmission attempt is not received; and making a further transmission attempt by transmitting at least the PUSCH using a second format different from the obtained format when the number of transmission attempts is larger than a predetermined value.

According to another aspect of the disclosure, there is further provided a method for Physical Uplink Shared Channel, PUSCH, format adaptation by a User Equipment, comprising, obtaining a set of format options and one or more selection criteria from a network node via broadcast System Information; determining a format to be used for two-step Random Access Channel, RACH, Message A, MsgA, from the set of format options and the criteria based on an estimated downlink, DL, signal quality and payload size; and transmitting a PUSCH using the determined format.

According to another aspect of the disclosure, there is further provided a method in a User Equipment of transmitting a random access preamble and a physical uplink shared channel, comprising, determining a modulation state and a code rate to be used for the physical uplink shared channel; determining a parameter for transmitting the physical uplink shared channel based on the modulation state and the code rate; identifying resources to be used from a predetermined set of resources, each resource being identified with a first index n and occupying a distinct set of OFDM symbols and subcarriers; identifying a Physical Random Access Channel, PRACH, preamble with a second index n' corresponding to the first index; and transmitting the identified PRACH preamble, and the physical uplink shared channel in the identified resources using the determined parameter.

According to another aspect of the disclosure, there is further provided a method in a User Equipment of transmitting a random access preamble and a physical uplink shared channel, comprising, determining a resource size to be used to contain the physical uplink shared channel, the resource size being one of a set of predetermined sizes; identifying resources to be used from a predetermined set of resources, the number of resources in the set of resources corresponding the determined resource size, each resource being identified with a first index n and occupying a distinct set of OFDM symbols and subcarriers according to the resource size; identifying a PRACH preamble with a second index n' corresponding to the first index n; and transmitting the identified PRACH preamble, and the physical uplink shared channel in the identified resource.

In an embodiment, the method may further comprise determining a parameter to use for transmitting the physical uplink shared channel from a predetermined set of values.

In an embodiment, transmitting the physical uplink shared channel in the identified resources may further comprise transmitting the physical uplink shared channel using the determined parameter.

The parameter may include one or more of an antenna port used to transmit a reference signal for the physical uplink shared channel; a scrambling index of an antenna port used to transmit a reference signal for the physical uplink shared channel; and a scrambling identity of scrambling used on encoded bits of the physical uplink shared channel.

In an embodiment, identifying resources to be used from a predetermined set of resources may further comprise randomly selecting the first index n such that each value of the first index is selected with substantially equal probability.

In an embodiment, identifying a PRACH preamble may further comprise setting the second index n' that identifies the PRACH preamble equal to the value of the first index n.

In an embodiment, each resource in the predetermined set of resources may comprise a first resource subset and a second resource subset, where the first resource subset may comprise a first set of OFDM symbols and a first set of subcarriers; the second resource subset may comprise a second set of OFDM symbols and a second set of subcarriers; each OFDM symbol is one of the first set of OFDM symbols or one of the second set of OFDM symbols; and the first set of subcarriers is different from the second set of subcarriers.

According to another aspect of the disclosure, there is further provided a network node configured to communicate with a user equipment (UE), the network node comprising a radio interface and processing circuitry configured to implement any of the methods by the network node in the described embodiment of the present disclosure.

According to another aspect of the disclosure, there is further provided a User Equipment configured to communicate with a network node, the UE comprising a radio interface and processing circuitry configured to implement any of the methods by UE in the described embodiment of the present disclosure.

According to another aspect of the disclosure, there is further provided a communication system comprising computing elements and data storage elements, wherein the computing elements executes any of the methods as described in the embodiments of the present disclosure.

According to another aspect of the disclosure, there is further provided a computer program comprising instructions which, when executed on at least one processor, causes the at least one processor to execute any of the methods as described in the embodiments of the present disclosure.

According to another aspect of the disclosure, there is further provided a computer-readable medium having stored thereon computer program as described in the embodiments of the present disclosure.

According to another aspect of the disclosure, there is further provided a computer program product comprising a computer program and a computer readable medium as described in the embodiments of the present disclosure.

According to the embodiments of the present disclosure, advantageous effects may be achieved including that MsgA PUSCH capacity is increased and UL resource usage is improved without compromising MsgA robustness. This is particularly useful for increasing the capacity of short UL data transmission for Semi-Persistent Scheduling (SPS) and/or grant-free configurations.

BRIEF DESCRIPTION OF THE DRAWINGS

The above and other objects, features and advantages will be more apparent from the following description of embodiments with reference to the accompanied drawings, in which.

DETAILED DESCRIPTION

Figure 1A:
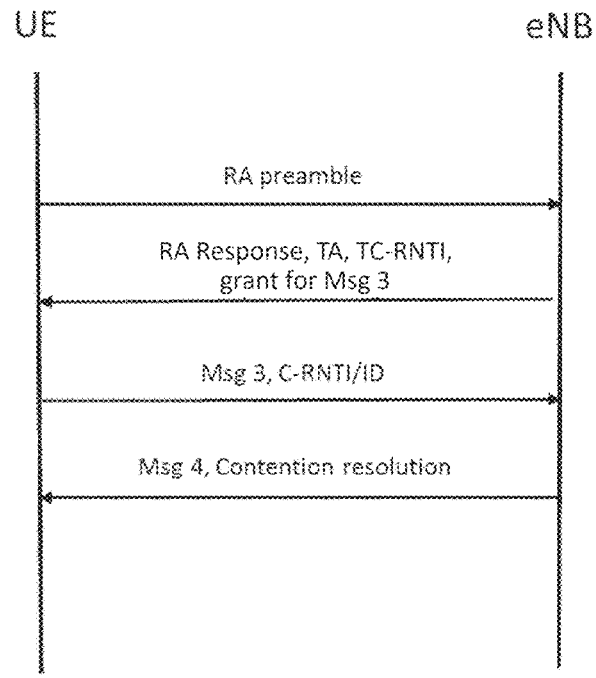
FIG. 1a is a schematic diagram illustrating a four-step RACH procedure.
Figure 1B:
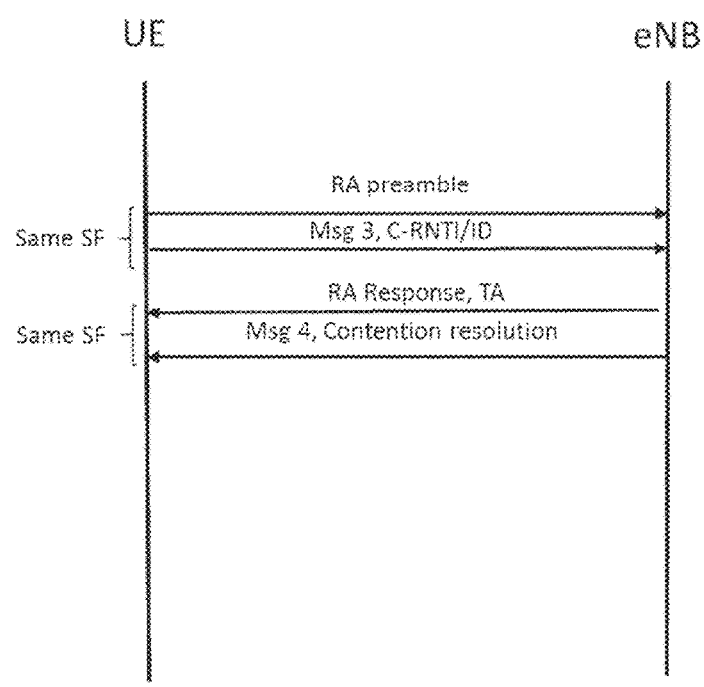
FIG. 1b is a schematic diagram illustrating a two-step RACH procedure.
Figure 1C:
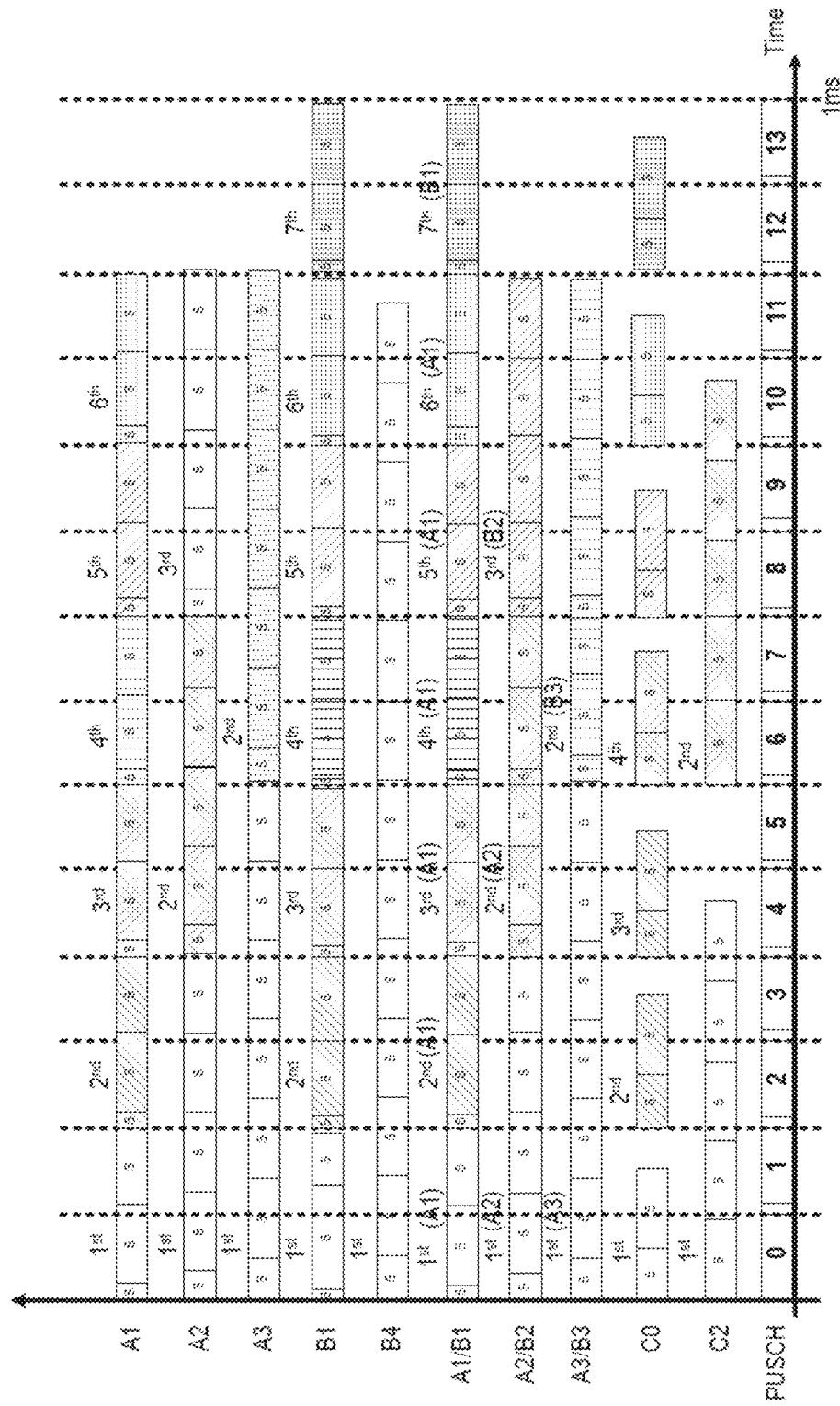
FIG. 1c is a schematic diagram illustrating an example of preamble format allocation in a slot.

The following embodiments of the present disclosure are described in detail with reference to the accompanying drawings. It shall be understood that these embodiments are discussed only for the purpose of enabling those skilled persons in the art to better understand and thus implement the present disclosure, rather than suggesting any limitations on the scope of the present disclosure.

We describe mechanisms for adapting the two-step RACH MsgA PUSCH format and/or MCS to channel conditions and other scenario parameters, either cell- or UE-specifically. The following main adaptation forms by the network (NW) or the network node include:

Cell-specific MCS selection and broadcasting by NW

UE-specific MCS selection and dedicated signaling by NW

Autonomous MCS selection by UE using NW-configured rules

Additionally, variants of the above approaches for targeting groups of UEs, indicating the MCS or a MCS subset for blind detection via preamble format selection, PUSCH occasion selection by the UE, and handling multiple PUSCH transmissions in a PUSCH occasion have also been described hereinafter.

In the context, the term "wireless communication network" refers to a network following any suitable communication standards, such as new radio (NR), Long Term Evolution (LTE), LTE-Advanced (LTE-A), Wideband Code Division Multiple Access (WCDMA), High-Speed Packet Access (HSPA), the Worldwide Interoperability for Microwave Access (WiMax), Bluetooth, and/or ZigBee standards network and any other network to be developed.

In the context, the terms "Network" or "NW" or "network node" may be used in an exchangeable way, which may be used to refer to, e.g., base station, an access point (AP), or any other suitable network device in the wireless communication network. The BS may include, for example, a Node B (NodeB or NB), an evolved NodeB (eNodeB or eNB), or gNodeB (gNB), a Remote Radio Unit (RRU), a Radio Header (RH), a Remote Radio Head (RRH), a relay, a low power node such as a femto, a pico, and so forth.

The terms "UE" may refer to a mobile terminal or other suitable user devices, for example, a Subscriber Station (SS), a Portable Subscriber Station, a Mobile Station (MS), or an Access Terminal (AT), portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), wireless endpoints, mobile stations, laptop-embedded equipment (LEE), laptop-mounted equipment (LME), smart devices, wireless customer-premises equipment (CPE) and the like.

In the context, PUSCH MCS selection may be understood as including one or more PUSCH format aspects such as the number of resources (number of PRBs/REs), their location in time/frequency, modulation, coding scheme, code rate and/or code/transport block size, the mapping type (normal slot or mini-slot), etc.

According to one embodiment, a solution of Cell-specific MCS selection and broadcasting by NW (also referred to as "approach 1") is described as below.

Figure 2:
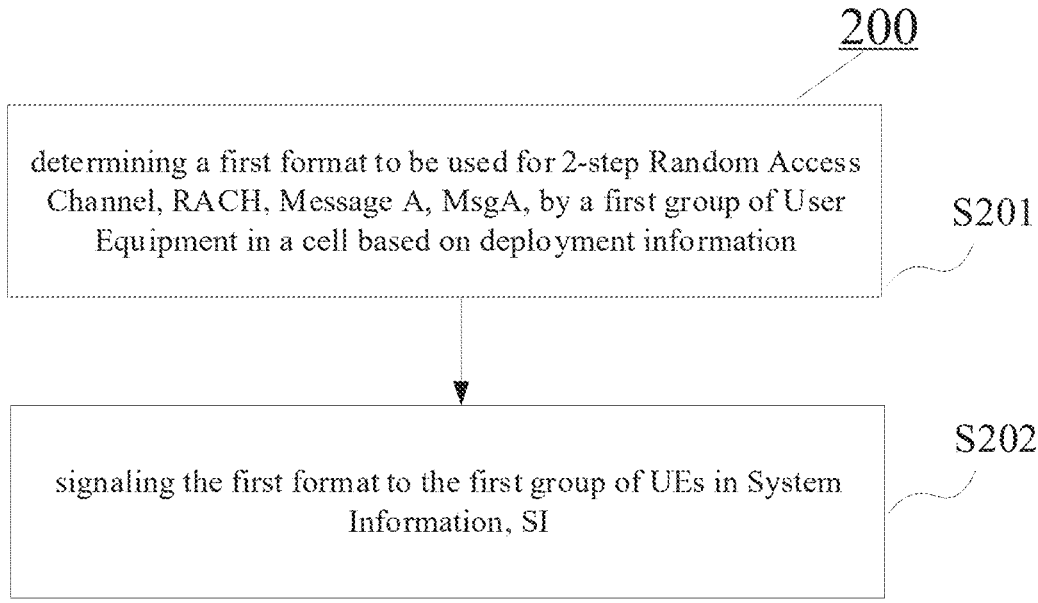
FIGS. 2-3 are schematic workflow diagrams illustrating methods for PUSCH format adaptation by a network node according to embodiments of the present disclosure.

As shown in FIG. 2, a method 200 for PUSCH format adaptation by a network node in a random access procedure is provided.

The method includes, at step S201, the network node first determines a first format to be used for two-step RACH MsgA by a first group of User Equipment in a cell based on deployment information. The deployment information may include one or more of a path loss and UE uplink transmit power, UE uplink transmission scheme and a number of antennas. At step S202, the network node sends the first format to the first group of UEs via System Information broadcasting.

In an embodiment, at least one criterion and at least a second format may be determined to be used for two-step RACH MsgA by at least a second group of UEs not satisfying the criterion in the cell. The criterion may include a PUSCH Block Error Rate (BLER) during a single transmission in performance criterion for uplink coverage. Then, the network node may send the second format and the criterion to the second group of UEs via System Information broadcasting. The first group of UEs in a cell may refer to a group of UEs or all UEs in the cell. The second group of UEs in a cell may refer to another non-overlapping group of UEs in the cell other than the first group of UEs in case the first group of UEs does not cover all of the UEs in the cell.

The step of sending the first format or the second format may be implemented by providing an index to a predetermined list of modulation and coding scheme, MCS, values; or providing an explicit individual parameter value.

The first format and/or the second format refer to PUSCH formats which may include one or more of the following, such as a number of resources, location in time/frequency, modulation and coding scheme, code rate, and code/transport block size, a mapping type.

Particularly, for example, the NW determines the PUSCH MCS to be used by all UEs in the cell for two-step RA procedure. The MCS may be selected so as to provide UL coverage for RACH for UEs in the most disadvantaged locations in the cell. The performance criterion for UL coverage may be PUSCH BLER during single transmission. The required MCS is primarily determined by the path loss and UE UL TX power, and additionally by the UE UL transmission scheme and the number of antennas. The NW may use the estimated worst-case path loss at the cell edge and the lowest TX power and multi-antenna configuration of UE categories allowed in the system.

In an embodiment, the NW may signal a selected MCS value in a field in system information (SI) by providing an index to a predetermined list of MCS values listed in a specification document. Alternatively, the NW may provide explicit individual parameter values in the SI field, including one or more of the ones listed above. The SI field containing the MCS information may be remaining system information (RMSI), which may be carried in system information block 1 (SIB1); other system information (OSI), which may be carried in SIBs other than SIB1; a physical broadcast channel (PBCH), which may carry a master information block (MIB); or dedicated SI for individual UEs.

In an embodiment, the UE may attempt MsgA transmission using the indicated MCS and if a predetermined number (e.g. 2-10) of MsgA transmission attempts fail (e.g. the preamble is detected while PUSCH decoding is unsuccessful due to either cyclic redundancy check failure or the number of error bits not meeting the bit error rate (BER) requirement), which the UE detects e.g. via not receiving a MsgB, the UE may re-attempt two-step RA using a default MCS. The number of transmission attempts is counted by the PREAMBLE_TRANSMISSION_COUNTER so the predetermined number could be based on this counter. However, since the power is ramped up for each transmission attempt an alternative threshold could be when the UE reaches a predetermined transmission power. If the transmission power is the main focus then an alternative counter could be the PREAMBLE_POWER_RAMPING_COUNTER. These counters are not always incremented simultaneously (especially in NR-U, where the latter is not incremented upon LBT failures).

In one related embodiment, the UE may in subsequent transmission(s) use an MCS (say MCS_new) lower than the indicated MCS (say MCS_indicated), where MCS_new can be a function of the MCS_indicated and at least one of the following parameters:
  PREAMBLE_POWER_RAMPING_COUNTER;
  PREAMBLE_TRANSMISSION_COUNTER;
  PRACH preamble format;
  PUSCH format (including a list of parameters provided in the beginning of this section)

The gNB may need to perform blind detection of the MCS if only
  PREAMBLE_POWER_RAMPING_COUNTER and/or
  PREAMBLE_TRANSMISSION_COUNTER is considered, as these two parameters are unknown to gNB.

The change of MCS in this embodiment may also be conditional on no back-off indication having been received. A back-off indication could imply that the gNB does not have processing resources to handle the request at the moment and not that a more robust MCS should be used. The default MCS which results in effectively more robust transmission than the selected MCS may be defined in a specification document, or additionally provided in the SI. The NW may attempt detection of PUSCH according to the selected MCS in the first occasions, and according to the default MCS in subsequent occasions, or it may attempt blind decoding according to both MCS options in some, or all, occasions.

The NW may change the selected MCS over time, including the indication in the SI, to ensure sufficient, but not excessive, robustness. As an extension of the embodiment with a default MCS, the NW may maintain statistics of the rate at which the default MCS in invoked and modify the selected MCS to keep that rate at a desired level, e.g. 1%.

The UE aspect of this embodiment consists of extracting the selected MCS information in the SI, including choosing between the selected and default MCS, and configuring its transmitter to operate using the chosen MCS.

According to another embodiment, the solution of UE-specific MCS selection and dedicated signaling by NW (also referred to as "approach 2") is described as below.

Figure 3:
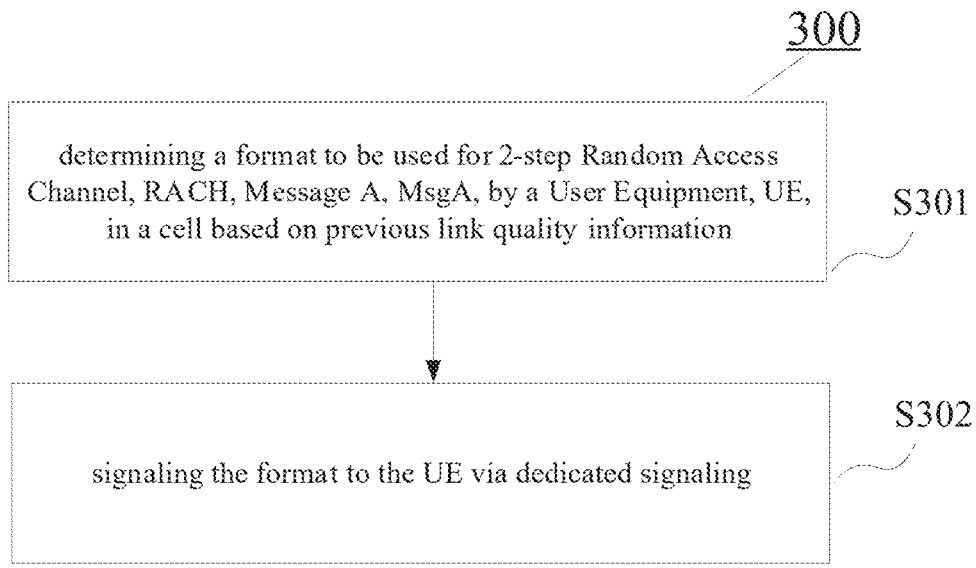

As shown in FIG. 3, a method 300 for PUSCH format adaptation by a network node in a random access procedure is provided.

The method 300 includes, at step S301, the network node first determining a format to be used for two-step RACH MsgA by a specific UE in a cell based on, e.g., previous link quality information. As an example, the format may be determined based on a triggering condition or presence of payload of a logical channel or a set of logical channels to meet a target performance. Then, at step S302, the network node sends the format to the UE via dedicated signaling.

Particularly, for example, the NW may provide a UE with a tailored PUSCH MCS. The NW may estimate the UL link quality based on previous, sufficiently recent transmissions by the UE, e.g. UL DMRS, Physical Uplink Control Channel (PUCCH), or Sounding Reference Signal (SRS), or based on Channel Quality Indication (CQI) reports provided by the UE. The NW then configures a PUSCH MCS that ensures that a predetermined performance metric, e.g. a target PUSCH BLER, is achieved.

This approach may be used ahead of a Contention Free Random Access (CFRA) attempt, e.g. in conjunction with handover (HO) procedures, or it may be applied when a UE enters RRC_IDLE or RRC_INACTIVE state and will perform contention based random access (CBRA) to reconnect at a later time instance. The UE may then be configured to use the provided MCS for a future RA attempt e.g. while the UE remains in the same cell and its estimated DL serving cell quality does not drop by more than a predetermined margin.

The NW may configure the UE with the selected MCS via e.g. Radio Resource Control (RRC) signaling or other HO/mobility-related signaling, including L1-2 signaling options, e.g. downlink control information or a Medium Access Control control element. The NW may signal a selected MCS value by providing an index to a predetermined list of MCS values listed in a specification document or by providing explicit individual parameter values, including one or more of the ones listed above.

In another alternative, the NW may configure the PUSCH MCS to be selected based on the triggering condition or presence of payload of a logical channel or a set of logical channels such that the resulting PUSCH BLER meets a target performance metric, this could for example be infrequent small user data payload with strict reliability and latency requirement or the presence of control signaling messages or other.

The UE aspect of this approach consists of extracting the selected MCS information from the dedicated NW signaling, including choosing between the selected and default MCS, and configuring its transmitter to operate using the chosen MCS.

According to another embodiment, the solution of using a default modulation & coding scheme (MCS) instead of a broadcasted MCS or individually designated MCS is described as below.

Figure 4:
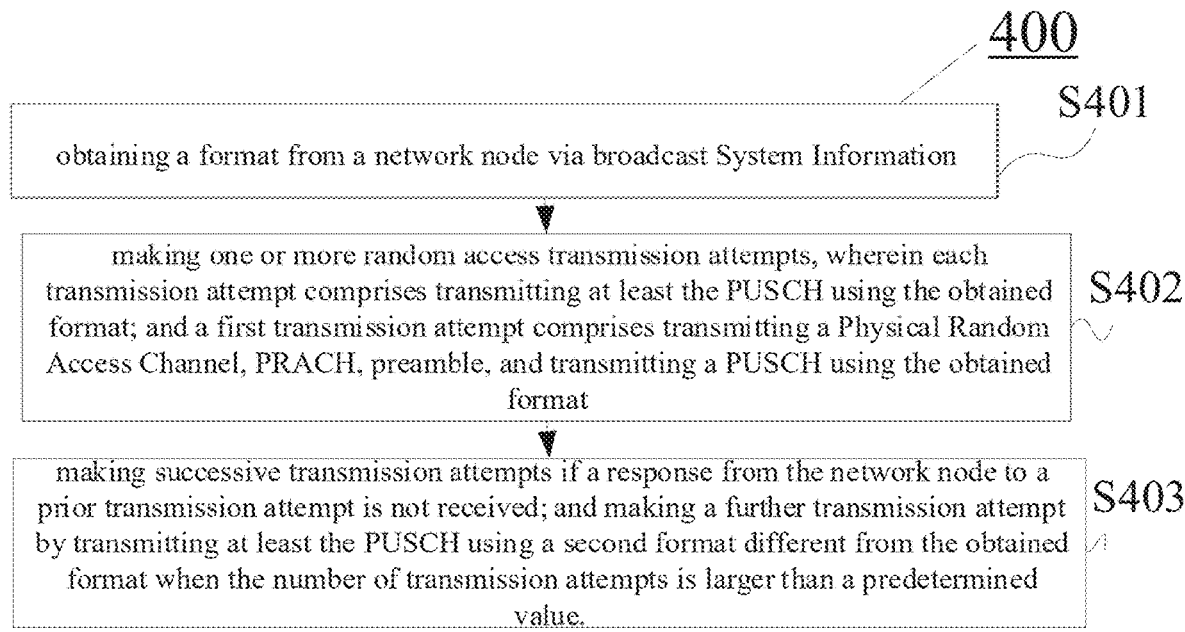
FIGS. 4-5 are schematic workflow diagrams illustrating methods for PUSCH format adaptation by UE according to embodiments of the present disclosure.

As shown in FIG. 4, a method 400 for PUSCH format adaptation by UE in a random access procedure is provided.

The method 400 includes, at step S401, the UE obtaining a format from a network node via broadcast System Information or dedicated signaling.

At step S402, the UE makes one or more random access transmission attempts based on the obtained format. Each transmission attempt may include transmitting at least the PUSCH using the obtained format. The first transmission attempt among the attempts may include transmitting a PRACH preamble, and transmitting a PUSCH using the obtained format.

At step S403, the UE makes successive transmission attempts if a response from the network node to a prior transmission attempt is not received. When the number of transmission attempts is larger than a predetermined value, the UE makes a further transmission attempt, which includes transmitting at least the PUSCH using a second format different from the obtained format.

According to another embodiment, a solution of autonomous MCS selection by UE using NW-configured rules (also referred to as "approach 3") is described as below.

Figure 5:
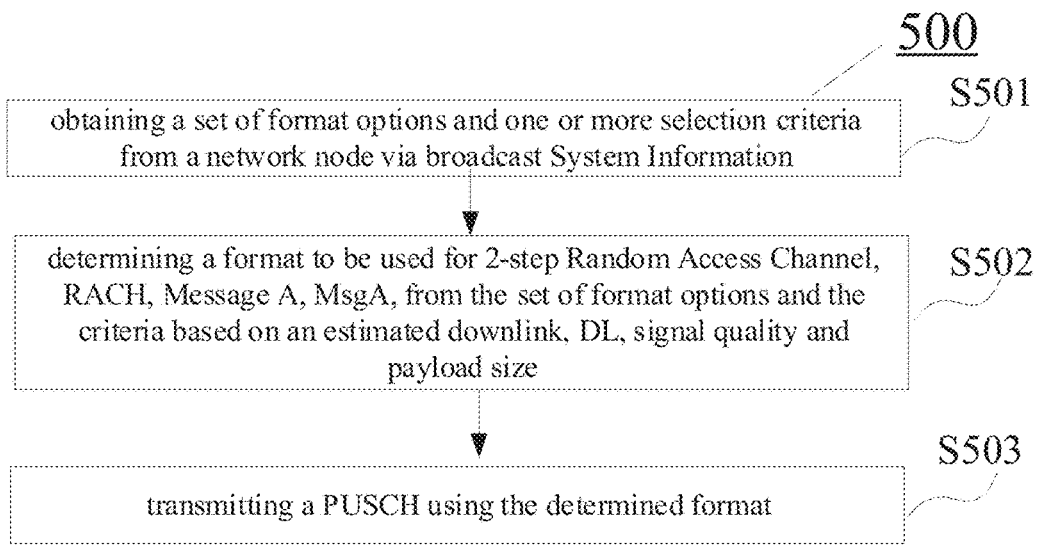

As shown in FIG. 5, a method 500 for PUSCH format adaptation by a UE in a random access procedure is provided.

The method 500 includes, at step S501, the UE obtaining a set of format options and/or one or more selection criteria from a network node via broadcast System Information. At step S502, the UE determines a format to be used for two-step RACH MsgA from the set of format options and/or the criteria based on, e.g., an estimated DL signal quality and payload size. At step S503, the UE transmits a PUSCH using the determined format.

Figure 6:
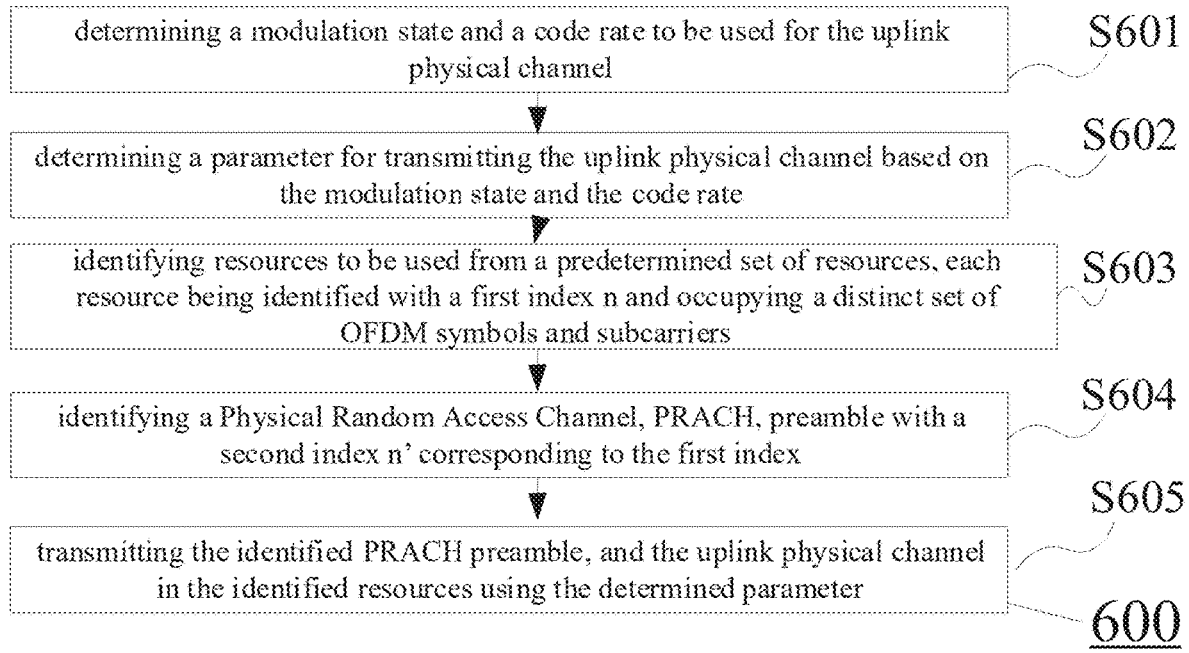
FIGS. 6-7 are schematic workflow diagrams illustrating methods in a User Equipment of transmitting a random access preamble and a physical uplink shared channel according to embodiments of the present disclosure.

As shown in FIG. 6, a method 600 in a UE of transmitting a random access preamble and a physical uplink shared channel is provided.

The method 600 includes, at step S601, the UE determining a modulation state and a code rate to be used for the physical uplink shared channel.

The determination may be based on at least estimated UL link quality and the PUSCH payload size. The UE may e.g. use a look-up table to look up the maximum-rate MCS that provides required detection performance for the given PUSCH block size and channel quality.

In some embodiments, the UE determines the modulation state and code rate by receiving control signaling, such as dedicated RRC signaling or a system information block, that indicates the modulation state and code rate. In other embodiments, the UE selects the modulation state and code rate from a predetermined list of modulation state and code rate combinations, the list being signaled to the UE in control signaling such as dedicated RRC signaling or a system information block. The UE may select the modulation state and code rate from the predetermined list by calculating an estimated UL link quality, where the estimated UL link quality can comprise a path loss estimate derived from a serving cell reference signal or a synchronization signal block (SSB). In some embodiments, the UE may compare the path loss estimate to a threshold path loss associated with each modulation state and code rate combination in the list, and select the modulation state and code rate combination whose threshold is the smallest threshold of the list that is greater than the path loss. In some embodiments, the UE determines the power needed to transmit a MsgA PUSCH in each of the PUSCH occasions according to the modulation state and code rate and a path loss estimate derived from a serving cell reference signal or an SSB, excluding the modulation state and code rate combinations in the list that require more power than the UE has available to transmit, such as when the PUSCH power would exceed a power $P_{CMAX,f,c}(i)$ as defined in the related 3GPP specification, and then selecting the modulation state and code rate combination from the list that requires the greatest power that is less than the UE has available to transmit.

At step S602, the UE further determines a parameter for transmitting the physical uplink shared channel based on the modulation state and the code rate. At step S603, the UE identifies resources to be used from a predetermined set of resources, each resource being identified with an index n and occupying a distinct set of OFDM symbols and subcarriers. At step S604, the UE identifies a PRACH preamble with an index n' corresponding to the index n. At step S605, the UE transmits the identified PRACH preamble, and then the physical uplink shared channel in the identified resources using the determined parameter.

Figure 7:
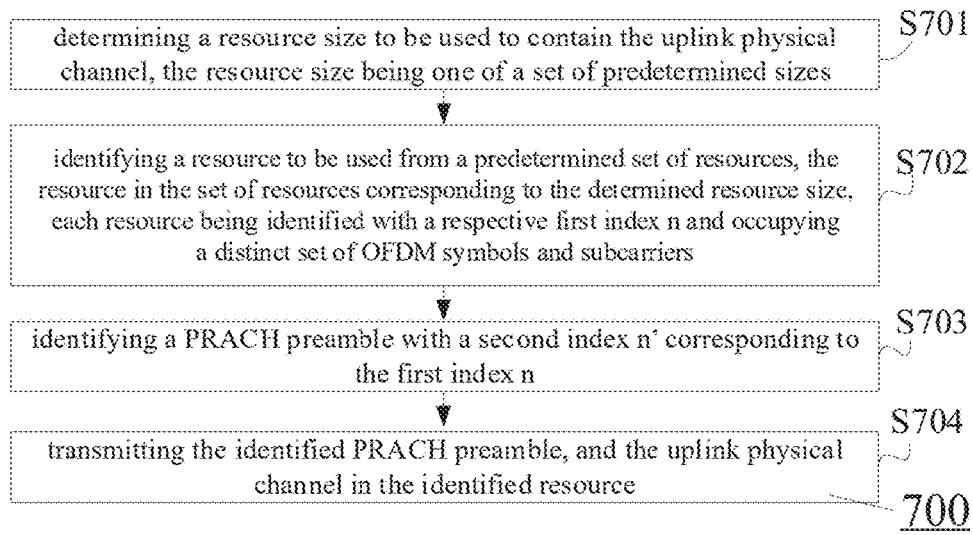

As shown in FIG. 7, a method 700 in a UE of transmitting a random access preamble and a physical uplink shared channel is provided.

The method 700 includes, at step S701, the UE determining a resource size to be used to contain the physical uplink shared channel, the resource size being one of a set of predetermined sizes.

At step S702, the UE identifies resources to be used from a predetermined set of resources. The resource in the set of resources corresponds to the determined resource size. Each resource is identified with an index n and occupies a distinct set of OFDM symbols and subcarriers. As an example, the index n may be randomly selected such that each value of the index is selected with substantially equal probability. The index n may further be indicative of a number of resources in the predetermined set of resources. At step S703, the UE identifies a PRACH preamble with an index n' corresponding to the index n. As an example, the index n' identifying the PRACH preamble may be set equal to the value of the index n. At step S704, the UE transmits the identified PRACH preamble, and then the physical uplink shared channel in the identified resource.

In an embodiment, the UE may further determine a parameter to use for transmitting the physical uplink shared channel from a predetermined set of values. As an example, the UE may transmit the physical uplink shared channel using the determined parameter. For example, the parameter may include one or more of e.g. an antenna port used to transmit a reference signal for the physical uplink shared channel; a scrambling index of an antenna port used to transmit a reference signal for the physical uplink shared channel; and a scrambling identity of scrambling used on encoded bits of the physical uplink shared channel.

In this embodiment, each resource in the predetermined set of resources may include a plurality of resource subsets, such as including a first resource subset and a second resource subset. The first resource subset may include a first set of OFDM symbols and a first set of subcarriers. The second resource subset may include a second set of OFDM symbols and a second set of subcarriers. Each OFDM symbol is one of the first set of OFDM symbols or one of the second set of OFDM symbols. The first set of subcarriers is different from the second set of subcarriers. Particularly, for example, the UE may determine the preferred MCS autonomously, based on e.g. its estimated UL link quality and the desired payload size. The UE may estimate the DL path loss based on received DL serving cell reference signal or SSB quality, then estimate the UL link quality based on the path loss and its UL TX power. The UE can then select an MCS that results in sufficiently low PUSCH BLER.

An example of this approach is to configure thresholds similar to what is done for selection of the Supplementary Uplink (SUL) carrier where if the reference signal received power (RSRP) of the downlink pathloss reference is less than rsrp-ThresholdSSB-SUL" the SUL carrier is selected and otherwise the normal NR UL is selected. In case of MCS selection, the same measurement quantity can be used but compared to a different threshold (one or several). The selection should be done during the Random Access procedure Initialization, the content of which may refer to Section 5.1.1 in 3GPP 38.321. Furthermore, different thresholds could be applied depending on if the SUL or normal UL has been selected.

The NW may perform tentative decoding of PUSCH according to the set of possible MCSs selectable by the UE.

The MCS options and the BLER target may be provided in a specification document, in broadcast SI, or via dedicated SI or RRC transmission to the UE. The list of MCS options preferably has a granularity and list length that provides a desired balance between effective PUSCH link adaptation (LA) and limited PUSCH blind decoding complexity. The desired balance may be determined by NW design.

An option to reduce the blind decoding effort, a mapping between preamble indexes (or preamble groups) and used MCS may be defined. In this case the UE would select preamble based (also) on which MCS is used. By using this option, the gNB will know which MCS the UE has used based on the received preamble.

In another embodiment, the PRACH preamble index is used to identify a list of candidate PUSCH resource allocation parameter sets, while the DMRS antenna port and/or scrambling ID identifies which of the candidate resource allocation parameter sets applies. In some embodiments, a PUSCH occasion may be defined e.g. as a contiguous set of Nf PRBS during $N_t$ symbols where the PUSCH is transmitted, where the absolute frequency and time locations are specified e.g. with respect to the SSB location or with respect to the MsgA preamble location. For example, a PRACH preamble index could map to one of 64 time-frequency locations (possible occasions) that can carry MsgA PUSCH, and the PUSCH in each of these time-frequency locations (occasions) could occupy, say, 4 PRBs and 14 OFDM symbols, and use either QPSK or 16 QAM modulation and a code rate of ⅓ or ⅔. These 4 combinations of modulation and code rate could then be identified each with one of 4 DMRS antenna port numbers used by the UE to transmit the PUSCH. Furthermore, in some embodiments, which PRBs are occupied by the PUSCH may be indicated by whether the UE transmits the DMRS in the PRB. In this way, the PUSCH can occupy less than the full time-frequency available in a time-frequency location, using only the PRBs needed for the data the UE has in its buffer.

In some embodiments, a predetermined set of time-frequency resources that can contain PUSCH occasions having at least one size is defined, which may be termed a 'MsgA PUSCH slot'.

Figure 8:
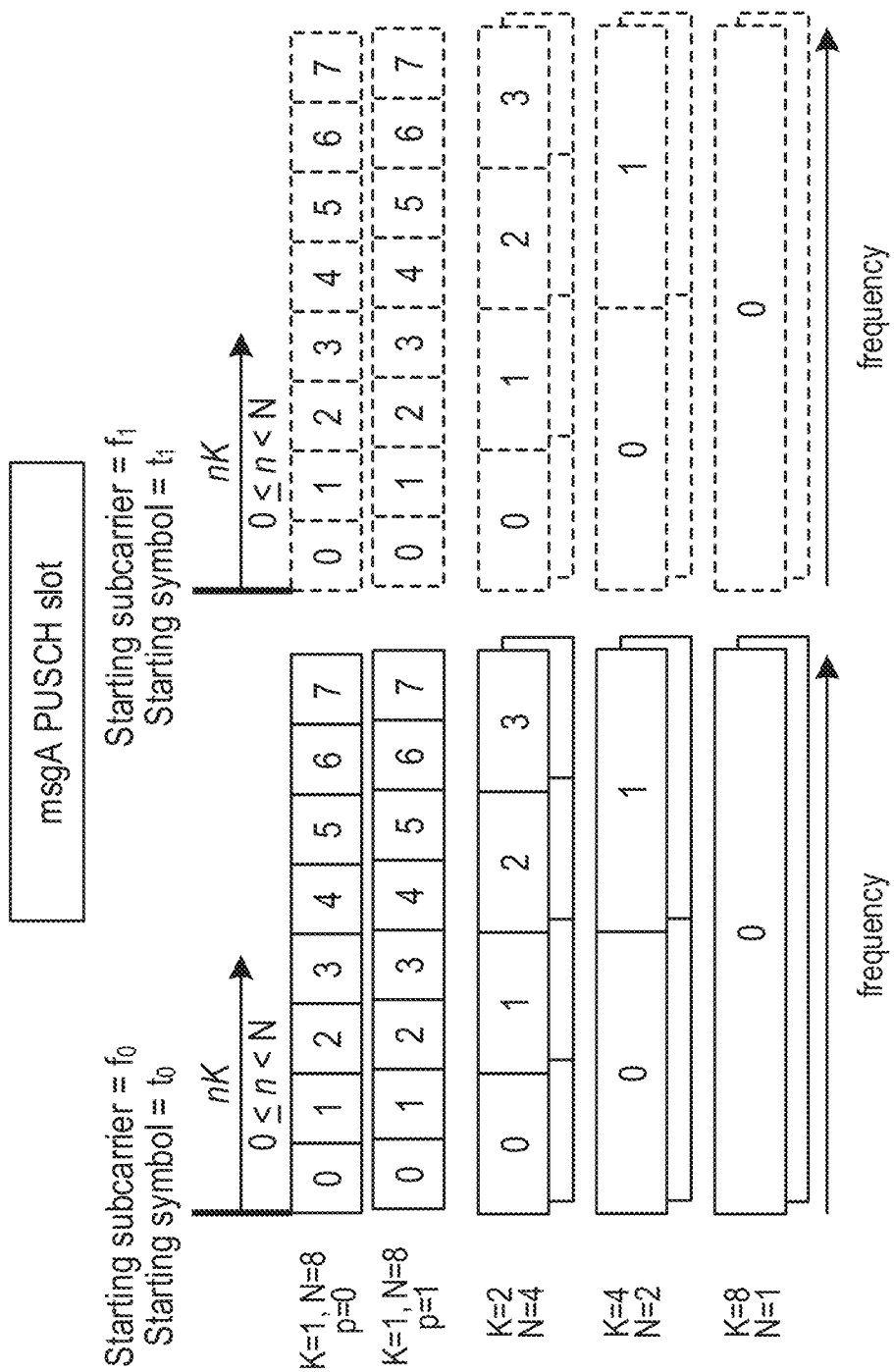
FIG. 8 is a schematic diagram illustrating a MsgA PUSCH slot containing different size PUSCH occasions according to an embodiment of the present disclosure.

Allowing a MsgA PUSCH slot occupying a given set of time-frequency resources to contain different size PUSCH occasions may be advantageous since this can avoid the need to use a different resource for each size PUSCH occasion, thereby reducing the amount of resource that needs to be allocated for MsgA PUSCH. The PUSCH occasion sizes can be integer multiples, such as a power of two, of a minimum PUSCH occasion size. This use of PUSCH occasions with integer multiple sizes may make it easier to pack variably sized PUSCH occasions into a MsgA PUSCH slot. One such embodiment is illustrated in FIG. 8. A MsgA PUSCH slot starting at time $t_0$ is shown. The time to may be defined relative to the time when an SSB, a RACH preamble associated with the PUSCH occasion, or the start of an NR radio frame. In the example shown, a PUSCH occasion can have one of 4 sizes, identified by K=1, K=2, K=4, or K=8. The size may be defined as the number of PRBs in the frequency domain in a given set of OFDM symbols. The starting point of the MsgA PUSCH slot in the frequency domain at time to is identified by $f_0$ in the figure and may be configured by higher layer signaling. The starting point $f_0$ may be given in suitable units such as a starting PRB or subcarrier. The position of a PUSCH occasion in a MsgA PUSCH slot is identified by an index n, with one index used for each of the possible PUSCH occasions in the MsgA PUSCH slot, and by the size of the PUSCH occasion, K. Therefore, in some embodiments the position may be calculated as nK. In some embodiments, the PUSCH occasions within a MsgA PUSCH slot are contiguous in frequency and therefore the MsgA PUSCH slot occupies $N_0 S$ subcarriers, where $N_0$ is the number of PUSCH occasions with size K=1 in the MsgA PUSCH slot, and S is the number of subcarriers occupied by the PUSCH occasions with size K=1. In some such embodiments, nKS is the number of PRBs away from the frequency domain start $f_0$.

In some embodiments, the size of the PUSCH occasion can be determined by the UE. The UE may pick the size from one of a predetermined set of sizes according to a rule, or the size may be assigned to the UE in control signaling. In some embodiments, the rule comprises determining the power needed to transmit a MsgA PUSCH in each of the PUSCH occasions according to its size, excluding the PUSCH occasion sizes that require more power than the UE has available to transmit, and then selecting the PUSCH occasion size that has at least the number of transport block bits that the UE has available to send. In some embodiments, the determination of PUSCH power is according to the method used to calculate the power $P_{PUSCH,b,f,c}$ (i, j, q, $q_d$, l) in 3GPP TS 38.213 rev. 15.4.0, subclause 7.1.1. The UE may then select which PUSCH occasion in a MsgA PUSCH slot with the determined size to use. The PUSCH occasion may be randomly selected with equal probability or approximately equal probability from those in the MsgA PUSCH slot. In some embodiments, which resources are occupied can be identified by whether the UE transmits a DMRS antenna port and/or scrambling ID that is associated with the UE in the resources used by the selected PUSCH occasion. In some embodiments, the UE may further determine a PRACH preamble with index n' to transmit according to an index of the selected PUSCH occasion, for example setting the preamble index equal to the index of the selected PUSCH occasion, that is, setting n'=n. This may have the benefit that a minimum number of PRACH resources is needed to identify MsgA transmission when the number of PUSCH occasions is fewer than the number of PRACH preambles in a PRACH occasion. In other embodiments, the UE may select the PRACH preamble according to both the size K and index n of the PUSCH occasion. The PRACH preamble index may then be selected such that one preamble index n' corresponds to only one combination of the size K and index n of the PUSCH occasion. In some such embodiments, the PRACH preamble index n' is determined according to $n' = n + \Sigma_{k=0}^{\tilde{k}-1} N_k$ where $0 \leq k < S$ with S being the number of different PUSCH occasion sizes, $N_k$ is the $k^{th}$ number of PUSCH occasions in the MsgA PUSCH slot and that corresponds to a size for PUSCH occasions, $N_{\tilde{k}}$ is the number of PUSCH occasions in the MsgA PUSCH slot with a determined size $\tilde{K}$ used for the PUSCH occasion with index n, and where $\Sigma_{k=0}^{-1} N_k = 0$. In some embodiments, the PRACH preamble index is determined as $n' = n + \Sigma_{k=0}^{k=log_2 R-1} N_0/2^k$ where $\tilde{K}$ is the determined size of the PUSCH occasion with index n, $N_0$ is the number of PUSCH occasions in the MsgA PUSCH slot with size K=1, and each PUSCH occasion has a size $K=2^k$, with k a non-negative integer, and where $\Sigma_{k=0}^{-1} N_k = 0$.

In some embodiments, each PUSCH occasion within a MsgA PUSCH slot may be frequency hopped. Each PUSCH occasion may then comprise multiple sets of OFDM symbols, where each set of OFDM symbols occupies a different set of frequency domain resources such as different subcarriers or different PRBs. The different sets of frequency domain resources should be well apart in frequency, such as half or multiples of one-fourth of the active bandwidth part.

Frequency hopped PUSCH occasions are illustrated in FIG. 8 where each MsgA PUSCH in a PUSCH occasion with index n and size K is transmitted in OFDM symbols starting at $t_0$ and at subcarriers starting at $f_0$ as well as in OFDM symbols starting at $t_1$ and subcarriers starting at $f_1$. The dashed lines indicate the use of frequency hopping for each PUSCH occasion n and size K. When the PUSCH occasions do not use frequency hopping, each MsgA PUSCH is transmitted in a single set of OFDM symbols and PRBs having a single frequency domain starting point $f_0$ and a single time domain starting point $t_0$.

In some embodiments, more than one MsgA PUSCH may occupy a MsgA PUSCH occasion, and each MsgA PUSCH in the occasion is identifiable according to a parameter. Such embodiments may have the benefit that a reduced amount of time frequency resource is needed to carry a given number of MsgA PUSCH transmissions. The parameter that identifies each MsgA PUSCH in a PUSCH occasion may be one or more of a DMRS antenna port, a DMRS scrambling ID, or a PUSCH scrambling ID. The parameter may be indexed with an integer p that may be set to one of a set of P values, and the UE may randomly select a value p from the set. In embodiments where the UE determines a PRACH preamble to transmit according to an index of the selected PUSCH occasion, the UE may select a PRACH preamble n' that corresponds to a single combination of the PUSCH occasion index n and the parameter index p. In some such embodiments, the UE may determine the preamble index n' as n'=nP+p, where 0<=n<N, where N is a number of PUSCH occasions in the MsgA PUSCH. A benefit of such embodiments may be that detecting the preamble identifies the presence of a PUSCH without the need to determine the value p, where such determination may require blindly detecting the associated DMRS scrambling ID or the value used for scrambling of PUSCH. In other embodiments, the UE may determine the preamble index n' as n'=n, where n identifies the time frequency location of the PUSCH occasion but not the parameter with index p. In this case, another mechanism is used for the gNB to identify which value of the parameter with index p was used to construct the MsgA PUSCH and/or its DMRS. In some embodiments, the gNB blindly detects which of the DMRS ports and/or DMRS scrambling IDs are used by the MsgA PUSCH, for example by hypothesizing that a given DMRS port and/or scrambling ID was used and checking the received SNR of the hypothesized DMRS against a threshold. If the SNR is above the threshold, the MsgA PUSCH corresponding to parameter p associated with the hypothesized DMRS is determined as present. Embodiments determining the PRACH preamble as the time-frequency location of the PUSCH occasion but not a parameter with index p used for PUSCH transmission may have the benefit that fewer PRACH preambles may be needed. The use of multiple MsgA PUSCHs in a PUSCH occasion is illustrated in FIG. 8. Two rows of N=8 PUSCH occasions with size K=1, each numbered from n=0 to n=7, and with the rows corresponding to MsgA PUSCH parameter p=0 and p=1, respectively. As can be seen, 16 MsgA PUSCHs can be multiplexed in the 8 PUSCH occasions due to the use of MsgA PUSCH that are identifiable with different parameters. While not labeled with different values of p, each PUSCH occasion in the remaining rows in the figure with K=2, 4, or 8 can also contain P MsgA PUSCHs. In some embodiments where different values of p correspond to distinct DMRS (either different ports or different DMRS scrambling), multiplexing the P MsgA PUSCHs in a PUSCH occasion can use multiuser multiple-input multiple-output (MU-MIMO) reception techniques. Embodiments that additionally use different PUSCH scrambling may use non-orthogonal multiple access (NOMA) reception techniques.

The UE aspect of this approach consists of extracting the MCS options information in the SI, estimating the preferred MCS given its channel quality and payload, and configuring its transmitter to operate using the chosen MCS.

Additional extensions are also provided as below.

In one extension, the NW may apply a hybrid of multiple approaches from those set out above.

For example, approaches 1 and 3 may be combined. UEs with link quality exceeding a threshold may employ approach 3 while UEs with worse link quality may adopt approach 1.

In another example, a UE configured according to approach 2 may use it if the serving cell quality change does not exceed the threshold and revert to approach 1 otherwise. Or a UE configured according to approach 2 may always overwrite the configuration according to approach 1.

In one extension, the MCS to use is partially or fully signaled by the NW implicitly via the PRACH configuration. The extension is applicable to any of the three MCS-selection methods described above (e.g., as approaches 1, 2 and 3). For a given PRACH configuration only a subset of MCSs may be eligible for use (which MCSs are allowed for which PRACH configuration can be listed in a specification document and/or preconfigured by the NW by other means, e.g. in the SI), implying that the explicit signaling only needs to differentiate between the MCSs in that subset, thereby reducing the amount of radio resources needed for the signaling of the MCS. For example, if there are in total N MCSs defined for PUSCH in the standard, but for the given PRACH configuration only M of those MCSs are eligible for use, then the explicit signaling need can be reduced from $\log_2(N)$ information bits to $\log_2(M)$ information bits. As a special case, M can equal 1, meaning no explicit signaling is needed. "PRACH configuration" above can refer to the PRACH configuration index, and/or the PRACH format, and/or frequency band, and/or some other PRACH-related parameters.

Methods described above allow adaptation of MsgA PUSCH format and/or MCS to allow maximal payload while not compromising reception robustness. The methods in the disclosure work in the absence of a conventional Link Adaptation (LA) mechanism. The present disclosure further includes the following embodiments.

A method embodiment for two-step RACH MsgA PUSCH format adaptation by the NW includes: determining a first format to be used by all UEs in a cell, e.g. based on deployment information, and optionally determining a criterion and a second format to be used by UEs not satisfying the criterion; and signaling the first format and optionally second format and a criterion in SI.

A method embodiment includes selecting, by UE, MsgA PUSCH MCS; identifying the MsgA PUSCH MCS with, e.g., DMRS antenna port, DMRS scrambling, and/or PUSCH scrambling; and transmitting PUSCH along with a particular PRACH preamble.

In an embodiment, PUSCH occasions in a MsgA PUSCH slot may have different sizes and a given PUSCH occasion may be transmitted along with a particular PRACH preamble.

In an embodiment, the PRACH preamble ID may be determined from the PUSCH occasion ID.

In an embodiment, PUSCH occasions may use MU-MIMO, identified by DMRS port and/or scrambling and/or by the PUSCH coded bit scrambling.

In an embodiment, PUSCH occasions may be frequency hopped; hopping is over disjoint symbols, and subcarriers should be different.

Figure 9A:
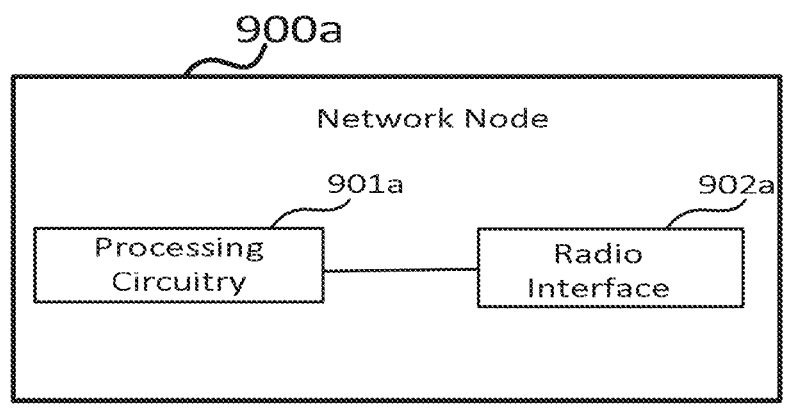
FIG. 9a is a schematic block diagram illustrating a network node according to an embodiment of the present disclosure.

FIG. 9a is a schematic block diagram illustrating a network node 900a according to an embodiment of the present disclosure.

The network node 900a as shown in FIG. 9a is configured to communicate with UE. The network node may include a radio interface 901a and processing circuitry 902a. The processing circuitry 902a may be configured to implement the methods for PUSCH format adaptation by the network node as described in the embodiments of the present disclosure.

In another embodiment, the network node for PUSCH format adaptation may include a determining module for determining a first format to be used for two-step RACH MsgA by a first group of UEs in a cell based on deployment information; and a signaling module for signaling the first format to the first group of UEs in System Information. As an example, the determining module may be configured further to determine at least one criterion and at least a second format to be used for two-step RACH MsgA by at least a second group of UEs not satisfying the criterion in the cell. The signaling module may be configured further to signal the second format and the criterion to the second group of UEs in System Information SI.

In another embodiment, the network node 900a may include a determining module determining a format to be used for two-step RACH MsgA by a UE in a cell based on, e.g., previous link quality information; and a signaling module signaling the format to the UE via dedicated signaling.

Figure 9B:
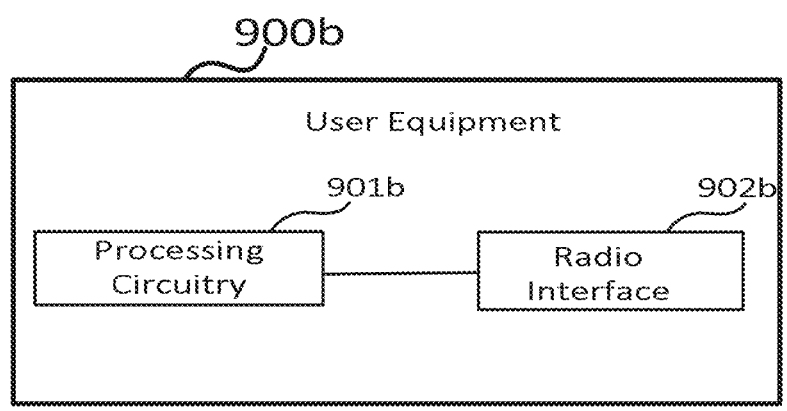
FIG. 9b is a schematic block diagram illustrating a UE according to an embodiment of the present disclosure.

FIG. 9b is a schematic block diagram illustrating a UE 900b according to an embodiment of the present disclosure.

The UE 900b as shown in FIG. 9b is configured to communicate with a network node. The UE may include a radio interface 901b and processing circuitry 902b. The processing circuitry 902b may be configured to implement the methods for PUSCH format adaptation or the methods for transmitting a random access preamble and a physical uplink shared channel by UE as described in the embodiments of the present disclosure.

In an embodiment, a UE for PUSCH format adaptation may include an obtaining module for obtaining a set of format options and one or more selection criteria from a network node via broadcast System Information; a determining module for determining a format to be used for two-step RACH MsgA from the set of format options and the criteria based on an estimated DL signal quality and payload size; and a transmitting module for transmitting a PUSCH using the determined format.

In an embodiment, a UE for transmitting a random access preamble and a physical uplink shared channel may include an obtaining module for obtaining a format from a network node via broadcast System Information or dedicated signaling; a first transmission module for making one or more random access transmission attempts, wherein each transmission attempt comprises transmitting at least the PUSCH using the obtained format; and a first transmission attempt comprises transmitting a Physical Random Access Channel, PRACH, preamble, and transmitting a PUSCH using the obtained format; and a second transmission module for making successive transmission attempts if a response from the network node to a prior transmission attempt is not received; and making a further transmission attempt by transmitting at least the PUSCH using a second format different from the obtained format when the number of transmission attempts is larger than a predetermined value.

In an embodiment, a UE for transmitting a random access preamble and a physical uplink shared channel may include a first determining module for determining a modulation state and a code rate to be used for the physical uplink shared channel; a second determining module for determining a parameter for transmitting the physical uplink shared channel based on the modulation state and the code rate; a first identifying module for identifying resources to be used from a predetermined set of resources, each resource being identified with a first index n and occupying a distinct set of OFDM symbols and subcarriers; a second identifying module for identifying a Physical Random Access Channel, PRACH, preamble with a second index (n') corresponding to the first index; and a transmitting module for transmitting the identified PRACH preamble, and the physical uplink shared channel in the identified resources using the determined parameter.

In an embodiment, a UE for transmitting a random access preamble and a physical uplink shared channel may include a determining module for determining a resource size to be used to contain the physical uplink shared channel, the resource size being one of a set of predetermined sizes; a first identifying module for identifying resources to be used from a predetermined set of resources, the number of resources in the set of resources corresponding the determined resource size, each resource being identified with a first index n and occupying a distinct set of OFDM symbols and subcarriers according to the resource size; a second identifying module for identifying a PRACH preamble with a second index n' corresponding to the first index n; and a transmitting module for transmitting the identified PRACH preamble, and the physical uplink shared channel in the identified resource.

Other features or operations as described as above for the methods may also adapted to the network node or UE when necessary and omitted here for simplicity and conciseness.

The disclosure also provides a communication system comprising computing elements and data storage elements, wherein the computing elements executes any of the methods as described in the embodiments of the present disclosure.

The disclosure also provides a computer program comprising instructions which, when executed on at least one processor, causes the at least one processor to carry out any of the methods as described in the embodiments of the present disclosure.

The disclosure also provides a computer-readable medium having stored thereon computer program for carrying out any of the methods as described in the embodiments of the present disclosure.

The disclosure also provides a computer program product comprising a computer program and a computer readable medium as described above.

The present disclosure also includes the following, where high level aspects of MsgA channel structure for two-step RACH are discussed. Features needed to support low latency operation and operation in unlicensed spectrum are highlighted, and alternatives to construct MsgA from Rel-15 PRACH and PUSCH, waveforms for PUSCH, and numerology for PUSCH and PRACH are analysed.

One of the key requirements for MsgA structure is that it supports low latency. In both licensed and unlicensed operation in NR-U, this is enabled by minimizing the duration of PRACH and PUSCH components of MsgA. However, for NR-U, one of the main benefits of the two-step RACH is the reduced need of listen-before-talk (LBT) operations compared to the four-step RA procedure. In case MsgA would need two LBTs much of the benefit of the two-step RACH would disappear. Therefore, it is of vital importance that MsgA can be transmitted using only one LBT, i.e. that there is no gap between PRACH and PUSCH longer than 16 µs.

For both licensed and unlicensed operation, MsgA configurations should support transmission in as few symbols as possible to meet the lowest latency requirements. For NR-U, it is important that MsgA can be transmitted using only one LBT, and therefore that there are no gaps within MsgA longer than 16 µs.

In 3GPP RAN1meeting #96, an agreement on a basic definition of PUSCH occasion structure was reached:

PUSCH occasion for two-step RACH is defined as the time-frequency resource for payload transmission.

In order to understand how to configure PUSCH occasions, some further refinement of PUSCH occasion structure seems needed. The design can be motivated by the following observations:

In contention-based operation, a UE will randomly select some MsgA resources, and so it is necessary to define multiple PUSCH occasions that the UE is aware of so it can do the selection. These resources will need to be within some limited number of symbols or slots, in order to limit the latency of the two-step RACH procedure. This region in time that contains multiple PUSCH occasions might be termed a 'MsgA PUSCH slot'.

In order to improve spectral efficiency and to allow different payload sizes, it is desirable to allow the PUSCH occasions to have different sizes.

Since it is more efficient from a channel estimation perspective as well as desirable for low UE PAPR each PUSCH occasion should occupy a contiguous set of subcarriers and OFDM symbols. Spectral efficiency can be further improved through MU-MIMO techniques, where PUSCHs colliding within a PUSCH occasion have different DMRS. The DMRS enable the gNB to form channel estimates for each of the interfering PUSCH, which then allows an MMSE-IRC receiver in sufficiently good radio conditions to successfully decode all the PUSCHs.

The use of multiple MsgA PUSCHs in a PUSCH occasion is illustrated in FIG. 8. A MsgA PUSCH slot starting at time and frequency at $t_0$ and $f_0$ is shown. Here, a PUSCH occasion can have one of 4 sizes, identified by K=1, K=2, K=4, or K=8. Each PUSCH occasion is identified by its index 'n'. PUSCH occasions are ordered by frequency in this example for simplicity; PUSCH multiplexing can naturally be extended to both time and frequency. MU-MIMO is illustrated using the two rows of N=8 PUSCH occasions with size K=1, each numbered from n=0 to n=7, where the rows corresponding to MsgA PUSCH DMRS ports p=0 and p=1, respectively. This doubles the potential number of size K=1 MsgA PUSCH that can be multiplexed in the MsgA slot to 16. (Note: while not labeled with different values of p, each PUSCH occasion in the remaining rows in the figure with K=2, 4, or 8 can also contain 2 MsgA PUSCHs.)

One embodiment of the disclosure therefore proposes the following:

A set of resources containing multiple PUSCH occasions is defined (a 'MsgA PUSCH slot'), where:
 A MsgA PUSCH slot occurs periodically and has a known length in symbols
 Each PUSCH occasion occupies a contiguous set of subcarriers and symbols
 The PUSCH occasions can have different sizes, and a given PRB can contain PUSCH occasions with different sizes.
 PUSCHs in the same PUSCH occasion can have different DMRS It is possible that PUSCH occasions could have a different MCS, number of occupied PRBs, use a different PUSCH scrambling ID, as well as different DMRS ports or DMRS scrambling IDs. In order to simplify gNB receiver complexity, PRACH could convey any or all of these PUSCH parameters. However, especially given that PRACH is already reserved in Rel-15 for a wide variety of uses, it is desirable to minimize the number of parameters that PRACH conveys. The gNB should at least know the time-frequency resource containing the MsgA PUSCH, and so may at least determine the PUSCH occasion that corresponds to the preamble from the preamble ID.

There may be many more PRACH preambles than PUSCH occasions, and so the number of PUSCH occasions may be the limiting factor on how many collision-free MsgA transmissions are possible in a given slot. If a PUSCH occasion occupies a slot with say 2 PRBs, then a 10 MHz carrier with 15 kHz subcarrier spacing carrier could only have 25 PUSCH occasions per slot, compared to PRACH which can have 64 preambles even for formats less than one slot.

Therefore if MsgA resources are selected according to PUSCH occasion, substantially fewer PRACH preambles could be needed than if MsgA resources were selected according to the maximum number of available PRACH preambles.

The following observations are made:
 It is desirable to minimize the number of parameters conveyed by PRACH resources
 Designs for PUSCH occasions could potentially have many different PUSCH configurations
  PUSCH occasions could have a different MCS, number of occupied PRBs, use a different PUSCH scrambling ID, as well as different DMRS ports or DMRS scrambling IDs, etc.
 The gNB must at least be able to identify the MsgA PUSCH time frequency resources, hence the PUSCH occasion, via the preamble ID.
 There are generally many more PRACH preambles available than PUSCH occasions in a given amount of time-frequency resource.

A further embodiment of the disclosure therefore proposes the following:
 Use a one-to-one preamble to PUSCH occasion mapping as a starting point, at least for the occasions with minimum size.
  Further study the need for additional PUSCH parameters conveyed by the preamble In 3GPP RAN1 meeting #96, the following agreements were made on the waveform of the MsgA:
  Both DFT-s-OFDM and CP-OFDM are supported for the payload transmission in MsgA;
  For further study (FFS): how to indicate/configure the waveform.

For the signaling of the waveform, in NR release 15, msg3-transformPrecoder was included in RACH-Config-Common IE to signal the waveform used for msg3 in 3GPP TS 38.331 V15.4.0.

So, similarly, a MsgA-transformPrecoder can be included in the same IE to indicate the waveform of the MsgA PUSCH for two-step RA.

One embodiments of the disclosure therefore proposes the following:
 Signal whether transform precoding is enabled for MsgA PUSCH in system information.

In 3GPP RAN1 meeting #96, the following agreements were made to address the numerology of the MsgA (e.g., PUSCH and PRACH numerology):

Consider the following numerology for MsgA PUSCH (for possible down-selection)
  Alt 1: follow the numerology configured for the UL BWP
    FFS: initial vs. active UL BWP
  Alt 2: same as MsgA preamble numerology at least for some cases
    E.g., when short preamble is used (L=139)

From a gNB perspective, allowing the PUSCH and PRACH numerologies to be the same or different enables PRACH and PUSCH resource allocation flexibility to be traded off for reception complexity. As long as the signalling overhead is minimal (i.e. no more than a few bits carried in SIB1), maintaining this flexibility that is already available in Rel-15 seems reasonable. For the preamble of MsgA, if the preambles are shared between two-step and four-step RA or they are in the same RACH occasion, they will need to have the same numerology to both occupy the RACH occasion.

For the MsgA PUSCH part, keeping the same numerology as the numerology configured for the whole BWP which is also used for msg3 in four-step RA, alternative 1 is preferred, as mixed numerologies on a BWP seems unnecessarily complex.

One embodiment of the disclosure therefore proposes the following:

For the preamble part of MsgA, if the preambles are in the same RACH occasion, the numerology of four-step RA preambles is the same as that of the two-step RA preambles.

Support alternative 1: the numerology of MsgA should be the same as the numerology configured for the UL BWP.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

The following numbered paragraphs set out embodiments of the disclosure:

1. A method for Physical Uplink Shared Channel, PUSCH, format adaptation by a network node in a random access procedure, comprising,
   determining a first format to be used for two-step Random Access Channel, RACH, Message A, MsgA, by a first group of User Equipment in a cell based on deployment information; and signaling the first format to the first group of UEs in System Information, SI.

2. The method of embodiment 1, further comprising:
   determining at least one criterion and at least a second format to be used for two-step RACH MsgA by at least a second group of UEs not satisfying the criterion in the cell; and signaling the second format and the criterion to the second group of UEs in System Information SI.

3. The method of embodiment 1 or 2, wherein the criterion includes a PUSCH BLER during a single transmission in performance criterion for uplink coverage.

4. The method of embodiment 1 or 2, wherein the first format and the second format include one or more of a number of resources, location in time/frequency, modulation and coding scheme, code rate, and code/transport block size, a mapping type.

5. The method of embodiment 1 or 2, wherein the deployment information includes one or more of a path loss and UE uplink transmit power, UE uplink transmission scheme and a number of antennas.

6. The method of embodiment 1 or 2, wherein signaling the first format or the second format comprises providing an index to a predetermined list of modulation and coding scheme, MCS, values; or providing an explicit individual parameter value.

7. A method for Physical Uplink Shared Channel, PUSCH, format adaptation by a network node in a random access procedure, comprising,
   determining a format to be used for two-step Random Access Channel, RACH, Message A, MsgA, by a User Equipment, UE, in a cell based on previous link quality information; and signaling the format to the UE via dedicated signaling.

8. The method of embodiment 7, wherein determining a format is based on a triggering condition or presence of payload of a logical channel or a set of logical channels to meet a target performance.

9. A method for Physical Uplink Shared Channel, PUSCH, format adaptation by a User Equipment in a random access procedure, comprising,
obtaining a format from a network node via broadcast System Information or dedicated signaling;
making one or more random access transmission attempts, wherein each transmission attempt comprises transmitting at least the PUSCH using the obtained format; and a first transmission attempt comprises transmitting a Physical Random Access Channel, PRACH, preamble, and transmitting a PUSCH using the obtained format; and
making successive transmission attempts if a response from the network node to a prior transmission attempt is not received; and making a further transmission attempt by transmitting at least the PUSCH using a second format different from the obtained format when the number of transmission attempts is larger than a predetermined value.

10. A method for Physical Uplink Shared Channel, PUSCH, format adaptation by a User
Equipment in a random access procedure, comprising,
obtaining a set of format options and one or more selection criteria from a network node via broadcast System Information;
determining a format to be used for two-step Random Access Channel, RACH, Message A, MsgA, from the set of format options and the criteria based on an estimated downlink, DL, signal quality and payload size; and
transmitting a PUSCH using the determined format.

11. A method in a User Equipment of transmitting a random access preamble and a physical uplink shared channel, comprising,
determining a modulation state and a code rate to be used for the physical uplink shared channel;
determining a parameter for transmitting the physical uplink shared channel based on the modulation state and the code rate;
identifying resources to be used from a predetermined set of resources, each resource being identified with a first index n and occupying a distinct set of OFDM symbols and subcarriers;
identifying a Physical Random Access Channel, PRACH, preamble with a second index n' corresponding to the first index; and
transmitting the identified PRACH preamble, and the physical uplink shared channel in the identified resources using the determined parameter.

12. A method in a User Equipment of transmitting a random access preamble and a physical uplink shared channel, comprising,
determining a resource size to be used to contain the physical uplink shared channel, the resource size being one of a set of predetermined sizes;
identifying resources to be used from a predetermined set of resources, the number of resources in the set of resources corresponding the determined resource size, each resource being identified with a first index n and occupying a distinct set of OFDM symbols and subcarriers according to the resource size;
identifying a PRACH preamble with a second index n' corresponding to the first index n; and
transmitting the identified PRACH preamble, and the physical uplink shared channel in the identified resource.

13. The method of embodiment 12, further comprising determining a parameter to use for transmitting the physical uplink shared channel from a predetermined set of values.

14. The method of embodiment 13, wherein transmitting the physical uplink shared channel in the identified resources further comprises transmitting the physical uplink shared channel using the determined parameter.

15. The method of embodiment 11 or 13, wherein the parameter includes one or more of an antenna port used to transmit a reference signal for the physical uplink shared channel; a scrambling index of an antenna port used to transmit a reference signal for the physical uplink shared channel; and a scrambling identity of scrambling used on encoded bits of the physical uplink shared channel.

16. The method of embodiment 11 or 13, wherein identifying resources to be used from a predetermined set of resources further comprises randomly selecting the first index n such that each value of the first index is selected with substantially equal probability.

17. The method of embodiment 11 or 13, wherein identifying a PRACH preamble further comprises setting the second index n' that identifies the PRACH preamble equal to the value of the first index n.

18. The method of embodiment 11 or 13, wherein each resource in the predetermined set of resources comprises a first resource subset and a second resource subset, where
the first resource subset comprises a first set of OFDM symbols and a first set of subcarriers; the second resource subset comprises a second set of OFDM symbols and a second set of subcarriers;
each OFDM symbol is one of the first set of OFDM symbols or one of the second set of OFDM symbols; and
the first set of subcarriers is different from the second set of subcarriers.

19. A network node configured to communicate with a user equipment (UE), the network node comprising a radio interface and processing circuitry configured to,
determine a first format to be used for two-step Random Access Channel, RACH, Message A, MsgA, by a first group of User Equipment in a cell based on deployment information; and
signal the first format to the first group of UEs in System Information, SI.

20. A network node configured to communicate with a user equipment (UE), the network node comprising a radio interface and processing circuitry configured to,
determine a format to be used for two-step Random Access Channel, RACH, Message A, MsgA, by a User Equipment, UE, in a cell based on previous link quality information; and signal the format to the UE via dedicated signaling.

21. A User Equipment configured to communicate with a network node, the UE comprising a radio interface and processing circuitry configured to,
obtain a set of format options and one or more selection criteria from a network node via broadcast System Information;
determine a format to be used for two-step Random Access Channel, RACH, Message A, MsgA, from the set of format options and the criteria based on an estimated DL signal quality and payload size; and
transmit a PUSCH using the determined format.

22. A User Equipment configured to communicate with a network node, the UE comprising a radio interface and processing circuitry configured to,
obtaining a format from a network node via broadcast System Information or dedicated signaling;
making one or more random access transmission attempts, wherein each transmission attempt comprises transmitting at least the PUSCH using the obtained format; and a first transmission attempt comprises transmitting a Physical Random Access Channel, PRACH, preamble, and transmitting a PUSCH using the obtained format; and
making successive transmission attempts if a response from the network node to a prior transmission attempt is not received; and making a further transmission attempt by transmitting at least the PUSCH using a second format different from the obtained format when the number of transmission attempts is larger than a predetermined value.

23. A User Equipment configured to communicate with a network node, the UE comprising a radio interface and processing circuitry configured to,
determine a modulation state and a code rate to be used for the physical uplink shared channel;
determine a parameter for transmitting the physical uplink shared channel based on the modulation state and the code rate;
identify resources to be used from a predetermined set of resources, each resource being identified with a first index n and occupying a distinct set of OFDM symbols and subcarriers;
identify a Physical Random Access Channel, PRACH, preamble with a second index (n') corresponding to the first index; and
transmit the identified PRACH preamble, and the physical uplink shared channel in the identified resources using the determined parameter.

24. A User Equipment configured to communicate with a network node, the UE comprising a radio interface and processing circuitry configured to,
determine a resource size to be used to contain the physical uplink shared channel, the resource size being one of a set of predetermined sizes;
identify resources to be used from a predetermined set of resources, the number of resources in the set of resources corresponding the determined resource size, each resource being identified with a first index n and occupying a distinct set of OFDM symbols and subcarriers according to the resource size;
identify a PRACH preamble with a second index n' corresponding to the first index n;
transmit the identified PRACH preamble, and the physical uplink shared channel in the identified resource.

25. A communication system comprising computing elements and data storage elements, wherein the computing elements executes any of the methods of embodiments 1-18.

26. A computer program comprising instructions which, when executed on at least one processor, causes the at least one processor to carry out the method according to any one of embodiments 1-18.

27. A computer-readable medium having stored thereon computer program according to embodiment 26.

28. A computer program product comprising a computer program according to embodiment 26 and a computer readable medium according to embodiment 27.

The invention claimed is:
1. A method for transmitting a random access preamble and a physical uplink shared channel (PUSCH), the method performed by a User Equipment (UE) and comprising:
determining a resource size to be used to contain the PUSCH, the resource size being one of a set of predetermined sizes;
identifying a resource, having the determined resource size, to be used to contain the PUSCH, wherein:
the resource is identified from a predetermined set of resources,
the predetermined set corresponds to the determined resource size, and
the respective resources in the predetermined set are associated with respective first indices and occupy respective distinct sets of OFDM symbols and subcarriers;
identifying a physical random access channel (PRACH) preamble associated with a second index that corresponds to the first index associated with the identified resource; and
transmitting the following: the identified PRACH preamble, and the PUSCH in the identified resource.

2. The method of claim 1, further comprising determining a transmission parameter for the PUSCH from a predetermined set of values.

3. The method of claim 2, wherein transmitting the PUSCH in the identified resource comprises transmitting the PUSCH using the determined transmission parameter.

4. The method of claim 2, wherein the transmission parameter includes one or more the following:
an antenna port used to transmit a reference signal for the PUSCH;
a scrambling index of an antenna port used to transmit a reference signal for the PUSCH; and
a scrambling identity of scrambling used on encoded bits of the PUSCH.

5. The method of claim 1, wherein identifying a resource having the determined resource size comprises randomly selecting the first index associated with the identified resource from the respective first indices associated with respective resources of the predetermined set, based on a substantially equal probability of selecting each of the respective first indices.

6. The method of claim 1, wherein identifying a PRACH preamble comprises setting the second index associated with the PRACH preamble to be equal to the first index associated with the identified resource.

7. The method of claim 1, wherein each particular resource in the predetermined set comprises a first resource subset and a second resource subset, wherein:
the first resource subset comprises a first set of OFDM symbols and a first set of subcarriers;
the second resource subset comprises a second set of OFDM symbols and a second set of subcarriers;
each OFDM symbol occupied by the particular resource is one of the first set of OFDM symbols or one of the second set of OFDM symbols; and
the first set of subcarriers is different from the second set of subcarriers.

8. The method of claim 1, wherein the first indices are indicative of a number of resources in the predetermined set of resources.

9. A method for transmitting a random access preamble and a physical uplink shared channel (PUSCH), the method performed by a User Equipment (UE) and comprising:
identifying a resource to be used for the PUSCH from a predetermined set of resources, wherein the respective resources in the predetermined set are associated with respective first indices and occupy respective distinct sets of OFDM symbols and subcarriers;

identifying a physical random access channel (PRACH) preamble associated with a second index that corresponds to the following:
  the first index associated with the identified resource, and
  an index of a transmission parameter for the PUSCH, wherein the transmission parameter is associated with a modulation state and a code rate to be used for the PUSCH; and
transmitting the following: the identified PRACH preamble, and the PUSCH in the identified resource using the transmission parameter.

10. A User Equipment (UE) configured to communicate with a network node, the UE comprising:
  a radio interface; and
  processing circuitry operably coupled to the radio interface, whereby the processing circuitry and the radio interface are configured to:
    determine a resource size to be used to contain a physical uplink shared channel (PUSCH), the resource size being one of a set of predetermined sizes;
    identify a resource, having the determined resource size, to be used to contain the PUSCH, wherein:
      the resource is identified from a predetermined set of resources,
      the predetermined set corresponds to the determined resource size, and
      the respective resources in the predetermined set are associated with respective first indices and occupy respective distinct sets of OFDM symbols and subcarriers;
    identify a physical random access channel (PRACH) preamble associated with a second index that corresponds to the first index associated with the identified resource; and
    transmit the following: the identified PRACH preamble, and the PUSCH in the identified resource.

11. The User Equipment of claim 10, wherein the processing circuitry and the radio interface are further configured to determine a transmission parameter for the PUSCH from a predetermined set of values.

12. The User Equipment of claim 11, wherein the processing circuitry and the radio interface are configured to transmit the PUSCH in the identified resource based on transmitting the PUSCH using the determined transmission parameter.

13. The User Equipment of claim 11, wherein the transmission parameter includes one or more the following:
  an antenna port used to transmit a reference signal for the PUSCH;
  a scrambling index of an antenna port used to transmit a reference signal for the PUSCH; and
  a scrambling identity of scrambling used on encoded bits of the PUSCH.

14. The User Equipment of claim 10, wherein the processing circuitry and the radio interface are configured to identify a resource a resource having the determined resource size based on randomly selecting the first index associated with the identified resource from the respective first indices associated with respective resources of the predetermined set, based on a substantially equal probability of selecting each of the respective first indices.

15. The User Equipment of claim 10, wherein the processing circuitry and the radio interface are configured to identify a PRACH preamble based on setting the second index associated with the PRACH preamble to be equal to the first index associated with the identified resource.

16. The User Equipment of claim 10, wherein each particular resource in the predetermined set comprises a first resource subset and a second resource subset, wherein:
  the first resource subset comprises a first set of OFDM symbols and a first set of subcarriers;
  the second resource subset comprises a second set of OFDM symbols and a second set of subcarriers;
  each OFDM symbol occupied by the particular resource is one of the first set of OFDM symbols or one of the second set of OFDM symbols; and
  the first set of subcarriers is different from the second set of subcarriers.

17. The User Equipment of claim 10, wherein the first indices are indicative of a number of resources in the predetermined set of resources.

18. A User Equipment configured to communicate with a network node, the UE comprising:
  a radio interface; and
  processing circuitry operably coupled to the radio interface, whereby the processing circuitry and the radio interface are configured to perform operations corresponding to the method of claim 9.

* * * * *